(12) United States Patent
Kurita

(10) Patent No.: US 9,903,544 B2
(45) Date of Patent: Feb. 27, 2018

(54) LIGHT-EMITTING APPARATUS

(71) Applicant: CANON KABUSHIKI KAISHA, Tokyo (JP)

(72) Inventor: Masanao Kurita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/336,989

(22) Filed: Oct. 28, 2016

(65) Prior Publication Data

US 2017/0138548 A1    May 18, 2017

(30) Foreign Application Priority Data

Nov. 12, 2015    (JP) .................................. 2015-221970

(51) Int. Cl.

| F21V 9/00 | (2015.01) |
|---|---|
| F21K 9/64 | (2016.01) |
| F21V 7/04 | (2006.01) |
| F21V 9/06 | (2018.01) |
| F21V 13/14 | (2006.01) |
| F21V 23/00 | (2015.01) |
| G02B 5/02 | (2006.01) |
| F21Y 115/10 | (2016.01) |

(52) U.S. Cl.
CPC .................. *F21K 9/64* (2016.08); *F21V 7/04* (2013.01); *F21V 9/06* (2013.01); *F21V 13/14* (2013.01); *F21V 23/005* (2013.01); *G02B 5/0278* (2013.01); *F21Y 2115/10* (2016.08)

(58) Field of Classification Search
CPC ... F21K 9/64; F21V 7/04; F21V 13/14; F21V 23/005; F21V 9/06; G02B 5/0278; F21Y 2115/10
See application file for complete search history.

(56) References Cited

U.S. PATENT DOCUMENTS

| 8,343,575 | B2 | 1/2013 | Dubrow | |
|---|---|---|---|---|
| 8,697,471 | B2 | 4/2014 | Dubrow | |
| 9,139,767 | B2 | 9/2015 | Dubrow | |
| 9,199,842 | B2 | 12/2015 | Dubrow et al. | |
| 2004/0037080 | A1* | 2/2004 | Luk .................... | H05B 33/0857 362/249.12 |
| 2008/0094829 | A1* | 4/2008 | Narendran ............... | F21K 9/00 362/231 |
| 2012/0147292 | A1* | 6/2012 | Kasano ................ | G02F 1/1335 349/64 |

(Continued)

FOREIGN PATENT DOCUMENTS

| JP | 2013-544018 A | 12/2013 |
|---|---|---|
| JP | 2014-044828 A | 3/2014 |

*Primary Examiner* — Donald Raleigh
(74) *Attorney, Agent, or Firm* — Fitzpatrick, Cella, Harper & Scinto

(57) ABSTRACT

A light-emitting apparatus according to the present invention is a light-emitting apparatus configured to emit light from a light-emitting surface, and includes: a light source configured to emit first light that is ultraviolet light or near-ultraviolet light; a conversion member configured to convert the first light to second light that is white light; and a first filter member configured to reflect the first light and transmit the second light, wherein the light source, the conversion member, and the first filter member are provided in an order of the light source, the conversion member, and the first filter member in a direction from the light source toward the light-emitting surface.

20 Claims, 7 Drawing Sheets

(56) References Cited

U.S. PATENT DOCUMENTS

| | | | |
|---|---|---|---|
| 2012/0201025 A1* | 8/2012 | Cash | H05B 33/0857 |
| | | | 362/231 |
| 2013/0335677 A1 | 12/2013 | You | |
| 2014/0055037 A1 | 2/2014 | Kurita | |
| 2015/0253653 A1* | 9/2015 | Fujita | H04N 9/3111 |
| | | | 353/31 |
| 2015/0300600 A1 | 10/2015 | Dubrow et al. | |
| 2015/0338064 A1* | 11/2015 | Ishino | G02F 1/133615 |
| | | | 349/61 |
| 2016/0009988 A1 | 1/2016 | Dubrow | |
| 2016/0047514 A1* | 2/2016 | Marinus | F21K 9/90 |
| | | | 362/84 |

* cited by examiner

LIGHT-EMITTING APPARATUS

BACKGROUND OF THE INVENTION

Field of the Invention

The present invention relates to a light-emitting apparatus.

Description of the Related Art

There is known a color image display apparatus that includes a color liquid crystal panel having a color filter, and a light-emitting apparatus (backlight apparatus) that irradiates the back surface of the color liquid crystal panel with white light. Conventionally, as a light source of the light-emitting apparatus, a fluorescent lamp such as a cold cathode fluorescent lamp (CCFL) has been mainly used. However, in recent years, as the light source of the light-emitting apparatus, alight emitting diode (LED) that is excellent in power consumption, life, color reproducibility, and environmental load has been used.

The light-emitting apparatus that uses the LED as the light source (LED backlight apparatus) has a large number of the LEDs in general. Japanese Patent Application Laid-open No. 2014-44828 discloses the LED backlight apparatus having a plurality of light-emitting blocks. Each light-emitting block has one or more LEDs. In addition, Japanese Patent Application Laid-open No. 2014-44828 discloses that the light emission brightnesses of the plurality of light-emitting blocks are individually controlled.

It is possible to improve the contrast of a display image (an image displayed on a screen) by reducing the light emission brightness of the light-emitting block that irradiates a low-brightness display area of the screen with light or increasing the light emission brightness of the light-emitting block that irradiates a high-brightness display area of the screen with light. The low-brightness display area is an area in which a dark image is displayed, and the high-brightness display area is an area in which a bright image is displayed. Such light emission brightness control of each light-emitting block corresponding to the feature of the image is referred to as "local dimming control". In addition, the local dimming control that increases the display brightness (the brightness on the screen) of a small area in which a bright image is displayed is referred to as "high dynamic range (HDR) control". With the HDR control, it is possible to express glare and glitter that couldn't be expressed conventionally.

As the light-emitting apparatus that realizes an improvement in the color purity of light from the light-emitting apparatus, enlargement of the color gamut of the display image, and an improvement in the color reproducibility of the display image, the light-emitting apparatus having a quantum dot is proposed. Japanese Translation of PCT Application No. 2013-544018 discloses the light-emitting apparatus having the LED that emits blue light or ultraviolet light and a quantum dot sheet that converts the light from the LED to white light. The quantum dot sheet is a sheet (film)-like member that has the quantum dot as a phosphor (fluorescent material). Light that causes excitation of the phosphor is referred to as "excitation light", and light emitted from the phosphor by the excitation is referred to as "fluorescence". Consequently, light before the conversion by the quantum dot is the excitation light, and light after the conversion by the quantum dot is the fluorescence. The color purity of the fluorescence from the quantum dot is high, and hence it becomes possible to realize, for example, the enlargement of the color gamut of the display image and the improvement in the color reproducibility of the display image by using the quantum dot.

However, not all of the light from the LED is converted to the white light by the quantum dot sheet, and part of the light from the LED passes through the quantum dot sheet without being converted to the white light. Accordingly, in the conventional light-emitting apparatus that uses the quantum dot, not only the white light but also another light (blue light, ultraviolet light, or the like) is emitted from the light-emitting apparatus. It is desirable for only desired light to be emitted from the light-emitting apparatus, and it is not preferable that light different from the desired light is emitted from the light-emitting apparatus. In addition, in the conventional light-emitting apparatus that uses the quantum dot, extraction efficiency of the white light is low, and hence an increase in the power consumption of the light-emitting apparatus and a reduction in the light emission brightness of the light-emitting apparatus occur. The extraction efficiency of the white light is, e.g., the ratio of the white light from the light-emitting apparatus to the light from the LED (the light amount, brightness, or intensity of the light).

SUMMARY OF THE INVENTION

The present invention provides a technique for preventing light different from desired light from being emitted from the light-emitting apparatus.

The present invention in its first aspect provides a light-emitting apparatus configured to emit light from a light-emitting surface, comprising:

a light source configured to emit first light that is ultraviolet light or near-ultraviolet light;

a conversion member configured to convert the first light to second light that is white light; and a first filter member configured to reflect the first light and transmit the second light, wherein the light source, the conversion member, and the first filter member are provided in an order of the light source, the conversion member, and the first filter member in a direction from the light source toward the light-emitting surface.

The present invention in its second aspect provides an image display apparatus comprising:

the above-described light-emitting apparatus; and a display unit configured to display an image on a screen by transmitting light from the light-emitting apparatus.

According to the present invention, it is possible to prevent the light different from the desired light from being emitted from the light-emitting apparatus.

Further features of the present invention will become apparent from the following description of exemplary embodiments with reference to the attached drawings.

DESCRIPTION OF THE EMBODIMENTS

Embodiment 1

Hereinbelow, Embodiment 1 of the present invention will be described. A light-emitting apparatus according to the present embodiment can be used as, e.g., the light-emitting apparatus of an image display apparatus having a display unit that displays an image on a screen by transmitting light from the light-emitting apparatus. Specifically, the light-emitting apparatus according to the present embodiment can be used as the light-emitting apparatus of the image display apparatus such as a liquid crystal display apparatus, an advertisement display apparatus, or a sign display apparatus. The light-emitting apparatus according to the present embodiment can also be used as the light-emitting apparatus of the image display apparatus that uses a display element different from a liquid crystal element of the liquid crystal display apparatus (e.g., a microelectromechanical system (MEMS) shutter). The image display apparatus according to the present embodiment may be a color image display apparatus or may also be a monochrome image display apparatus. In addition, the light-emitting apparatus according to the present embodiment can also be used as the light-emitting apparatus of an apparatus other than the image display apparatus (an indoor lighting lamp, a street lamp, or the like).

Figure 1:
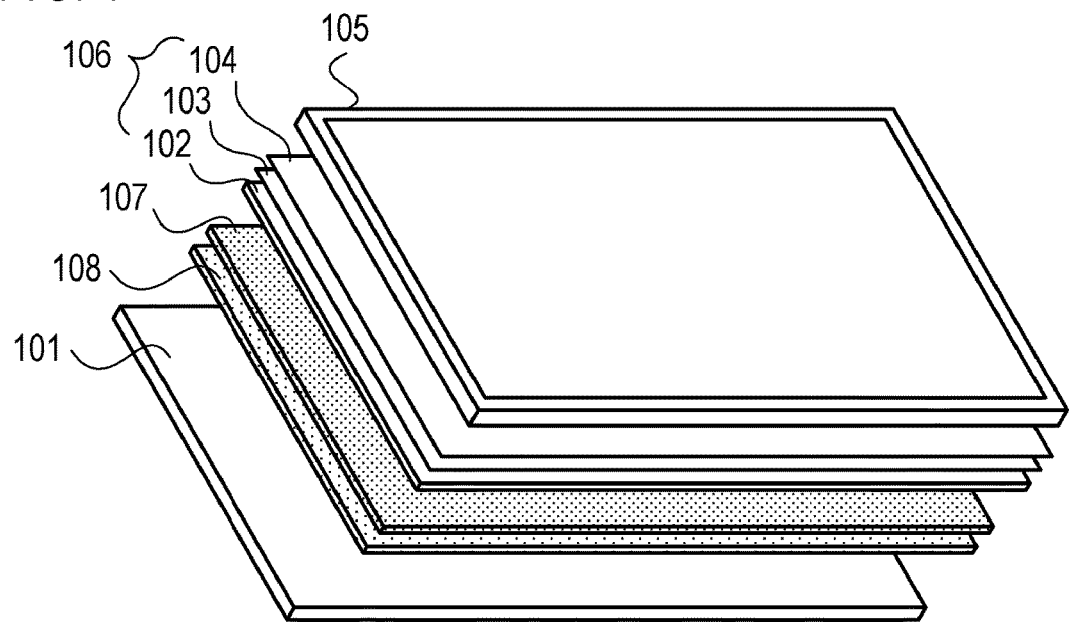
FIG. 1 is a schematic view showing an example of the configuration of a color image display apparatus according to Embodiment 1.

FIG. 1 is a schematic view showing an example of the configuration of the color image display apparatus according to the present embodiment. The color image display apparatus has a backlight apparatus and a color liquid crystal panel 105. The backlight apparatus has an LED circuit board 101, a quantum dot sheet 108, a dichroic filter 107, and an optical sheet 106. The optical sheet 106 has a diffusion plate 102, a light collection sheet 103, and a reflective polarizing film 104.

The backlight apparatus is a light-emitting apparatus that emits light from a light-emitting surface (a surface on the side of the color liquid crystal panel 105). Light emitted from the backlight apparatus is irradiated to the back surface of the color liquid crystal panel 105. The color liquid crystal panel 105 is a display unit that displays an image on a screen by transmitting the light from the backlight apparatus. Specifically, the color liquid crystal panel 105 has a plurality of pixels each including an R sub-pixel that transmits red light, a G sub-pixel that transmits green light, and B sub-pixel that transmits blue light. The color liquid crystal panel 105 controls the transmittance of the irradiation light for each sub-pixel. With this, the brightness of the irradiation light is controlled for each sub-pixel, and a color image is displayed.

The LED circuit board 101 emits first light. The first light is light that causes excitation of a predetermined phosphor. The light that causes the excitation of the phosphor is referred to as "excitation light". The LED circuit board 101 has a plurality of light sources. Each light source emits the first light. Each light source has one or more light-emitting elements. As the light-emitting element, it is possible to use a light emitting diode (LED), an organic EL element, a cold-cathode tube, a laser element and the like. In the present embodiment, ultraviolet light is used as the first light.

Note that the first light is not particularly limited. For example, as the first light, near-ultraviolet light, blue light, and light having a wavelength of about 200 to 400 nm (ultraviolet light to near-ultraviolet light) may also be used. In addition, the light source may have one type of the light-emitting element or may also have a plurality of types of the light-emitting elements.

The quantum dot sheet 108 is a conversion member that converts the first light (the ultraviolet light) to second light. For example, the quantum dot sheet 108 converts the first light emitted from the above light source to the second light. The quantum dot sheet 108 has a quantum dot as the phosphor. By irradiating the quantum dot with the first light, the excitation of the quantum dot is caused. As a result, the second light is emitted from the quantum dot. Light emitted from the phosphor by the excitation is referred to as "fluorescence". In the present embodiment, white light is used as the second light. The quantum dot sheet 108 is provided in a side of the light-emitting surface from the light source (the LED circuit board 101). In addition, the quantum dot sheet 108 is provided at a position opposing the light source (the LED circuit board 101).

Note that the second light is not particularly limited. For example, as the second light, yellow light, red light, or orange light may also be used. In addition, the configuration of the conversion member is not particularly limited. For example, the conversion member having the phosphor other than the quantum dot may also be used. One type of the phosphor may be used or a plurality of types of the phosphors may also be used.

The dichroic filter 107 is a first filter member that reflects the first light and transmits the second light. For example, the dichroic filter 107 reflects the first light having passed through the quantum dot sheet 108, and transmits the second light obtained by the quantum dot sheet 108. The dichroic filter 107 is provided in a side of the light-emitting surface from the quantum dot sheet 108. In addition, the dichroic filter 107 is provided at a position opposing the quantum dot sheet 108.

Note that the configuration of the first filter member is not particularly limited. For example, a cold filter that reflects ultraviolet light and infrared light and transmits visible light may be used as the first filter member.

The optical sheet 106 optically changes incident light. For example, the optical sheet 106 optically changes the second light having passed through the dichroic filter 107. The optical sheet 106 is provided in a side of the light-emitting surface from the dichroic filter 107. In addition, the optical sheet 106 is provided at a position opposing the dichroic filter 107. The diffusion plate 102 diffuses incident light to thereby cause the backlight apparatus to function as a planar light source. The light collection sheet 103 collects light that has been diffused by the diffusion plate 102 and has become incident at various incident angles in a front direction (the side of the color liquid crystal panel 105) to thereby improve a front brightness (the brightness in the front direction). The reflective polarizing film 104 polarizes incident light efficiently to thereby improve the front brightness.

The diffusion plate 102, the light collection sheet 103, and the reflective polarizing film 104 are stacked on each other and used. Note that the optical sheet 106 may include a member other than the above-described optical members, or may not include at least any of the above-described optical members. In addition, the optical sheet 106 and the color liquid crystal panel 105 may be configured integrally. The backlight apparatus may not have the optical sheet 106.

The backlight apparatus having such a configuration is referred to as "a direct type backlight apparatus" in general.

Figure 2:
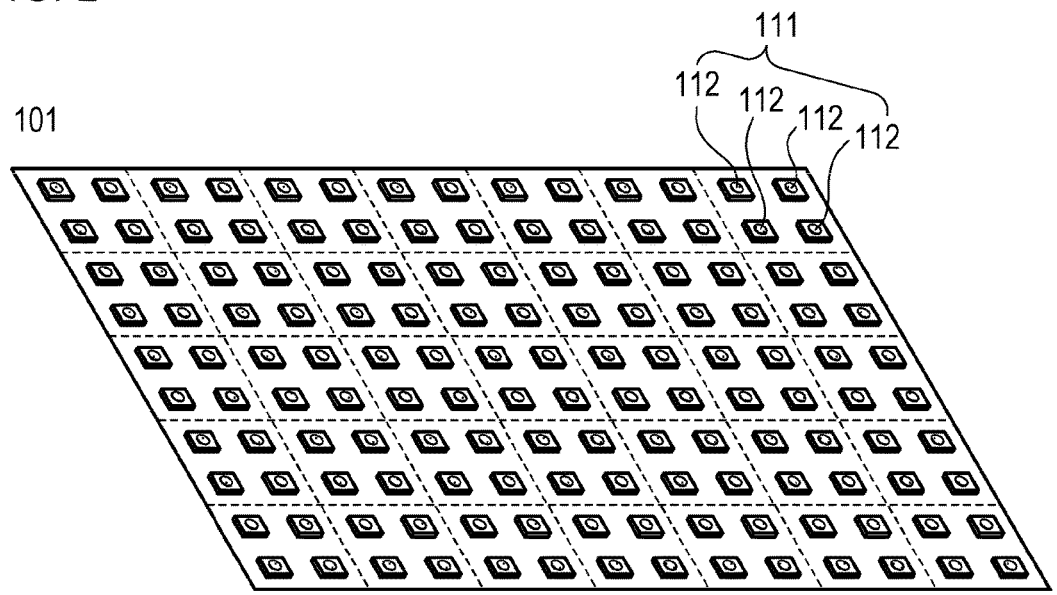
FIG. 2 is a schematic view showing an example of the configuration of an LED circuit board according to Embodiment 1.

FIG. 2 is a schematic view showing an example of the configuration of the LED circuit board 101. The LED circuit board 101 has a plurality of light-emitting blocks (light sources) 111 that correspond to a plurality of partial areas in the area of the light-emitting surface. The plurality of partial areas can be described as "a plurality of partial areas in the area of the screen". In the example in FIG. 2, the LED circuit board 101 has 35 light-emitting blocks 111 arranged in a matrix of 5 rows and 7 columns. The light emission brightnesses of the individual light-emitting blocks 111 can be controlled individually.

In each light-emitting block 111, four light-emitting elements (LEDs 112) are provided. In the example in FIG. 2, in each light-emitting block 111, four LEDs 112 arranged in two rows and two columns are provided. In the present embodiment, as the LED 112, an ultraviolet LED that emits ultraviolet light, which is the first light, is used.

Not that the number of the light-emitting blocks 111, the shape of the light-emitting block 111, and the disposition of the light-emitting blocks 111 are not particularly limited. One light-emitting block may be used as the LED circuit board 101. For example, in the LED circuit board 101, the 35 light-emitting blocks 111 described above may be used as one light-emitting block. In addition, a plurality of the light-emitting blocks 111 may be disposed in a staggered arrangement. In the example in FIG. 2, the shape of the light-emitting block 111 in the case where the light-emitting block 111 is viewed from the front direction is square, but the shape of the light-emitting block 111 may be triangular, pentagonal, hexagonal, or circular.

Similarly, the number of the partial areas, the shape of the partial area, and the disposition of the partial areas are not particularly limited. For example, a plurality of division areas constituting the screen or the area of the light-emitting surface may be used as the plurality of partial areas. The plurality of partial areas may be spaced apart from each other, or at least part of the partial areas may overlap at least part of the other partial areas.

Similarly, the number and the disposition of the LEDs 112 are not particularly limited.

Figure 3:
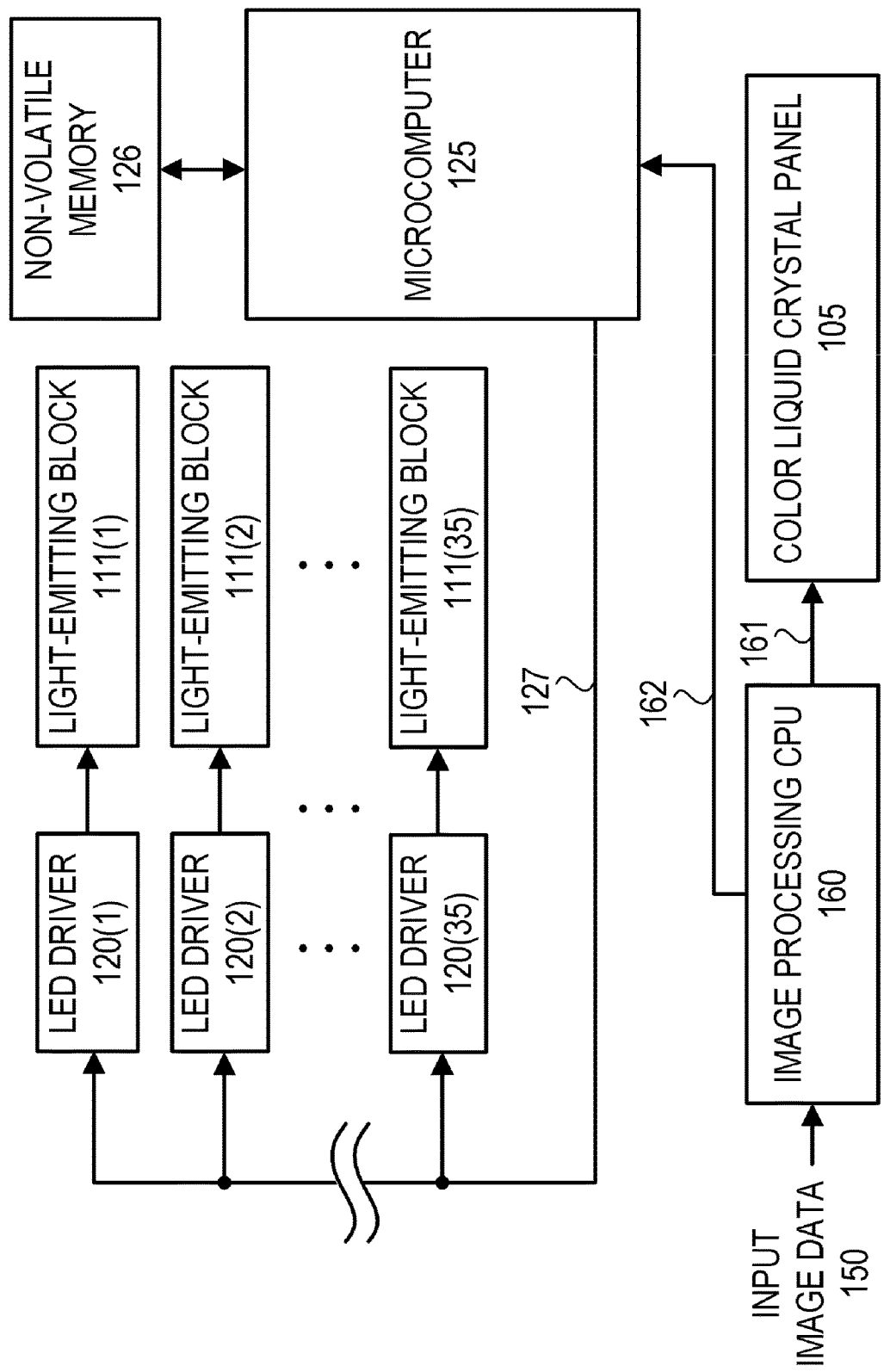
FIG. 3 is a block diagram showing an example of the configuration of the color image display apparatus according to Embodiment 1.

FIG. 3 is a block diagram showing an example of the configuration of the color image display apparatus according to the present embodiment. Hereinbelow, an example of the operation of the color image display apparatus in a case where an image based on input image data is displayed will be described by using FIG. 3.

In a case where input image data 150 is inputted to the color image display apparatus, an image processing CPU 160 analyzes the input image data 150. With this, the brightness of the input image data 150 in each of the 35 partial areas is determined. Accordingly, 35 brightnesses corresponding to the 35 partial areas are determined.

Subsequently, the image processing CPU 160 determines an LD correction value 162 of each light-emitting block 111 based on the determination result of the brightness of each partial area. The LD correction value 162 is determined such that, e.g., the light emission brightness of the light-emitting block 111 that irradiates a low-brightness display area of the screen with light is reduced from a reference brightness, and the light emission brightness of the light-emitting block 111 that irradiates a high-brightness display area of the screen with light is increased from the reference brightness. The low-brightness display area is an area in which a dark image is displayed, and the high-brightness display area is an area in which a bright image is displayed. The reference brightness is, e.g., the light emission brightness of each light-emitting block 111 in the case where control of the light emission brightness based on the input image data 150 is not performed. Herein, 35 LD correction values 162 corresponding to the 35 light-emitting blocks 111 are determined. The image processing CPU 160 outputs the LD correction value 162 of each light-emitting block 111 to a microcomputer.

In addition, the image processing CPU 160 generates display image data 161 by performing image processing on the input image data 150. In a case where local dimming control that individually changes the light emission brightness of each light-emitting block 111 is performed, there are cases where unintended brightness variations (halo phenomenon) resulting from a difference in light emission brightness between the plurality of light-emitting blocks 111 occur in a display image (an image displayed on the screen). In the image processing CPU 160, for example, image processing that reduces such brightness variations is performed. Specifically, by increasing the light emission brightness of a high-brightness display block, light leakage from the high-brightness display block to a low-brightness display block adjacent to the high-brightness display block is increased. The high-brightness display block is the light-emitting block 111 that irradiates the high-brightness display area with light, and the low-brightness display block is the light-emitting block 111 that irradiates the low-brightness display area with light. As a result, black floating is caused by such light leakage. In the image processing CPU 160, to cope with such black floating, image processing that reduces the brightness of the image data such that the black floating is reduced is performed. Subsequently, the image processing CPU 160 outputs the generated display image data 161 to the color liquid crystal panel 105. As a result, the transmittance of each sub-pixel of the color liquid crystal panel 105 is controlled to the transmittance corresponding to the display image data 161.

The reference brightness of each light-emitting block 111 is recorded in a non-volatile memory 126. The reference brightness may be a predetermined fixed value, or may also be a value that is updated appropriately. The reference brightness may be determined for each light-emitting block 111 individually, or one common reference brightness may be determined for the plurality of light-emitting blocks 111.

A microcomputer 125 reads the reference brightness of each light-emitting block 111 from the non-volatile memory 126. Subsequently, the microcomputer 125 generates an LED driver control signal 127 for each of the plurality of light-emitting blocks 111 based on the LD correction value 162 outputted from the image processing CPU 160 and the read reference brightness. Thereafter, the microcomputer 125 outputs the LED driver control signal 127 corresponding to the light-emitting block 111 to an LED driver 120 corresponding to the light-emitting block 111. In FIG. 3, the LED driver 120 corresponding to the light-emitting block 111 (X) is described as "LED DRIVER 120 (X)". The LED driver 120 (X) drives the light-emitting block 111 (X) in accordance with the inputted LED driver control signal 127. As a result, the light-emitting block 111 (X) emits light with the light emission brightness based on the LD correction value 162 and the reference brightness.

The LED driver control signal 127 represents, e.g., the pulse width of a pulse signal (a pulse signal of a current or a voltage) supplied to the light-emitting block 111. In this case, by adjusting the LED driver control signal 127, the pulse width of the pulse signal is adjusted. As a result, the light emission brightness of the light-emitting block 111 is subjected to PWM control. Note that the LED driver control signal 127 is not limited thereto. For example, the LED driver control signal 127 may also be a signal that represents the crest value of the pulse signal. In this case, by adjusting the LED driver control signal 127, the crest value of the pulse signal is adjusted. As a result, the light emission brightness of the light-emitting block 111 is subjected to PAM control. The LED driver control signal 127 may also be a signal that represents both of the pulse width of the pulse signal and the crest value of the pulse signal. In this case, by adjusting the LED driver control signal 127, at least one of the pulse width of the pulse signal and the crest value of the pulse signal is adjusted. Light emission brightness control that adjusts both of the pulse width of the pulse signal and the crest value of the pulse signal is referred to as "PHM control".

Note that the method of the local dimming control is not particularly limited. High dynamic range (HDR) control may also be performed. The HDR control is the local dimming control that increases the display brightness (the brightness on the screen) of a small area in which a bright image is displayed.

Figure 4:
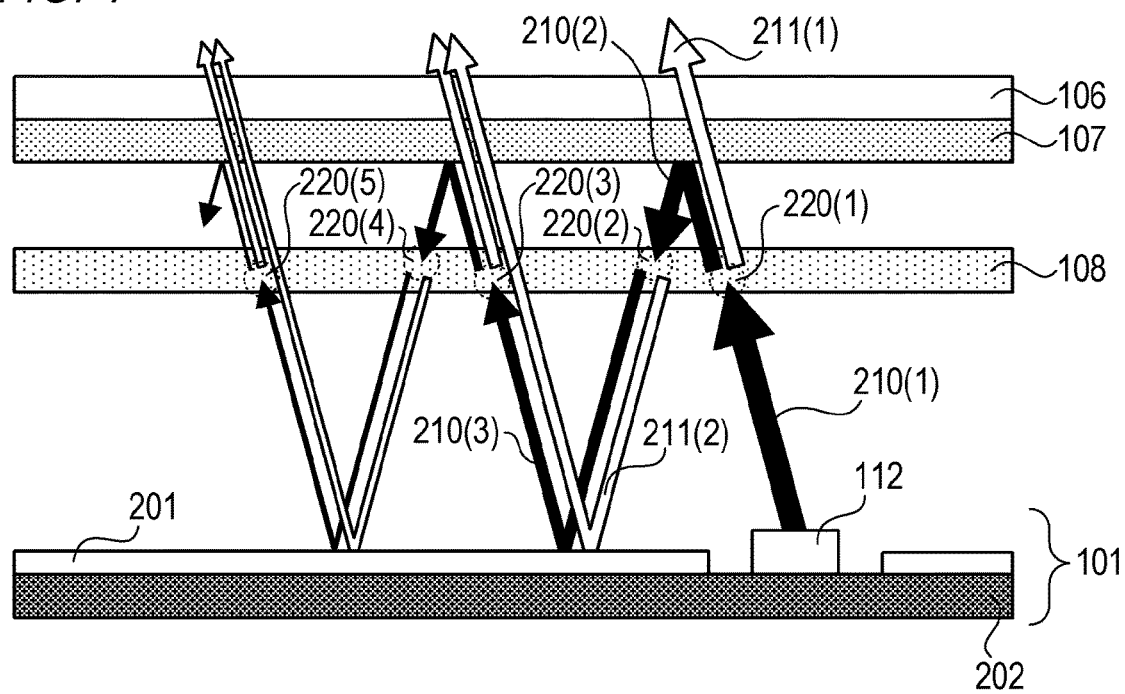
FIG. 4 is a cross-sectional view showing an example of the configuration of a backlight apparatus according to Embodiment 1.

FIG. 4 is a view showing an example of the configuration of the backlight apparatus according to the present embodiment. FIG. 4 is a cross-sectional view showing part of the cross section of the backlight apparatus in a direction perpendicular to the light-emitting surface. In the present embodiment, as shown in FIG. 4, the LED circuit board 101 has a circuit board 202, the light-emitting block 111, and a mirror reflection plate 201. The circuit board 202 is a circuit board that is substantially parallel to the light-emitting surface. The mirror reflection plate 201 is a reflection member that reflects light. For example, the mirror reflection plate 201 reflects light that travels from the side of the light-emitting surface to the side of the circuit board 202 (the first light and the second light) to the side of the light-emitting surface. The light-emitting block 111 and the mirror reflection plate 201 are provided on the circuit board 202 (on the circuit board). For example, the mirror reflection plate 201 (reflective film) is formed on the circuit board 202 by aluminum deposition. In addition, in the present embodiment, as shown in FIG. 4, in a direction from the light-emitting block 111 toward the light-emitting surface, the light-emitting block 111, the quantum dot sheet 108, the dichroic filter 107, and the optical sheet 106 are provided in this order.

Note that the positions of the light-emitting block 111 and the mirror reflection plate 201 are not limited to the positions shown in FIG. 4. For example, the light-emitting block 111 and the mirror reflection plate 201 may also be provided at positions away from the circuit board 202. In the direction perpendicular to the light-emitting surface, the position of the light-emitting block 111 may match the position of the mirror reflection plate 201, or may also be different from the position of the mirror reflection plate 201. The light-emitting block 111 may be provided in aside of the light-emitting surface from the mirror reflection plate 201, or the mirror reflection plate 201 may be provided in a side of the light-emitting surface from the light-emitting block 111. The mirror reflection plate 201 may simply be provided in a side of the light-emitting block 111 from the quantum dot sheet 108. The mirror reflection plate 201 may simply be provided in the vicinity of the light-emitting block 111 in a direction parallel to the light-emitting surface.

In a case where a current is supplied to the light-emitting block 111 via a circuit pattern formed on the circuit board 202, ultraviolet light 210 (1) is emitted from the light-emitting block 111. The ultraviolet light 210 (1) in various directions is emitted from the light-emitting block 111. For example, the ultraviolet light 210 (1) in various directions is emitted from the light-emitting block 111 such that, of the ultraviolet light 210 (1) emitted from the light-emitting block 111 to the side of the light-emitting surface, the intensity of the ultraviolet light 210 (1) emitted in the direction perpendicular to the light-emitting surface is maximized. "various directions" means all directions from the light-emitting block 111 to the side of the light-emitting surface. "various directions" may or may not include the direction parallel to the light-emitting surface. "various directions" may include a direction from the light-emitting block 111 to the side of the circuit board 202. In FIG. 4, for the sake of simplification, one arrow is shown as the ultraviolet light 210 (1). The wavelength of the ultraviolet light 210 (1) is about 200 to 400 nm. As the light emission material of the light-emitting block 111, a nitride semiconductor such as, e.g., GaN, InGaN, or AlGaN is used.

In a case where the ultraviolet light 210 (1) becomes incident on the quantum dot sheet 108, a wavelength conversion 220 (1) is performed in the quantum dot sheet 108. In the wavelength conversion 220 (1), part of the ultraviolet light 210 (1) acts as the excitation light, and part of the ultraviolet light 210 (1) is converted to white light 211 (1) as the fluorescence. The rest of the ultraviolet light 210 (1) passes through the quantum dot sheet 108 without being converted thereto. In FIG. 4, ultraviolet light 210 (2) is the ultraviolet light 210 (1) having passed through the quantum dot sheet 108. In order to obtain the white light as the fluorescence, the quantum dot sheet 108 includes the quantum dot that emits red light as the fluorescence, the quantum dot that emits green light as the fluorescence, and the quantum dot that emits blue light as the fluorescence.

Note that the quantum dot is not limited to the quantum dots of the three primary colors (red, green, and blue). For example, two types of the quantum dots including the quantum dot that emits yellow light as the fluorescence and the quantum dot that emits blue light as the fluorescence may be used. Four or more types (colors) of the quantum dots may also be used. The quantum dot is a semiconductor having a diameter of, e.g., about 1 to 30 nm. As the diameter of the quantum dot is smaller, the wavelength of the fluorescence emitted from the quantum dot is shorter.

Figure 5:
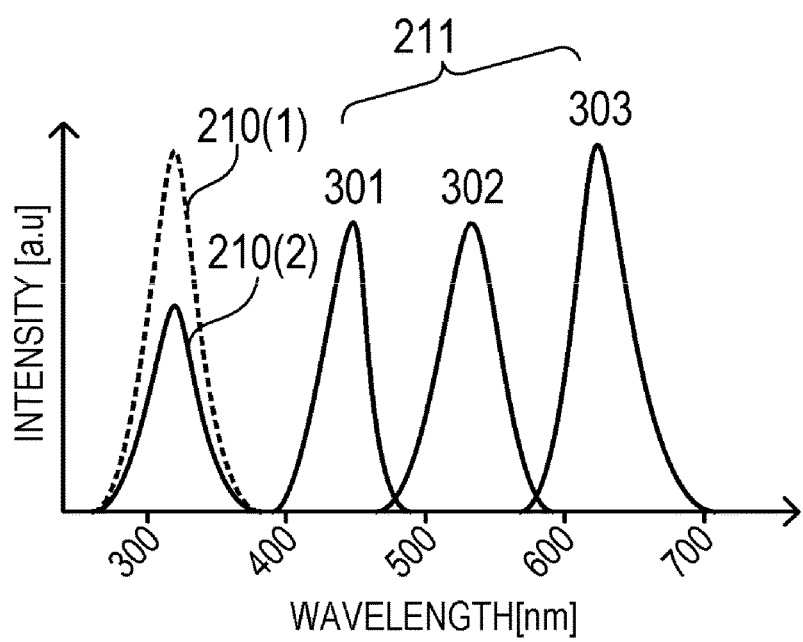
FIG. 5 is a graph showing examples of spectral characteristics of ultraviolet light and white light according to Embodiment 1.

FIG. 5 is a graph showing examples of spectral characteristics of the ultraviolet light 210 (1), the ultraviolet light 210 (2), and the white light 211 (1). The horizontal axis indicates the wavelength of light, and the vertical axis indicates the intensity of light. In the example in FIG. 5, the main wavelength of the ultraviolet light 210 (1) is about 320 nm. The white light 211 (1) includes blue light 301 having a main wavelength of about 450 nm, green light 302 having a main wavelength of about 530 nm, and red light 303 having a main wavelength of about 630 nm. In the example in FIG. 5, about half of light energy of the ultraviolet light 210 (1) is absorbed by the quantum dot, and is used for generation of the fluorescence. However, the remaining half of the light energy of the ultraviolet light 210 (1) passes through the quantum dot sheet 108 as the ultraviolet light 210 (2).

After the wavelength conversion 220 (1) is performed, the ultraviolet light 210 (2) and the white light 211 (1) become incident on the dichroic filter 107. The ultraviolet light 210 (2) is reflected by the dichroic filter 107. The white light 211 (1) passes through the dichroic filter 107 and the optical sheet 106.

Figure 6:
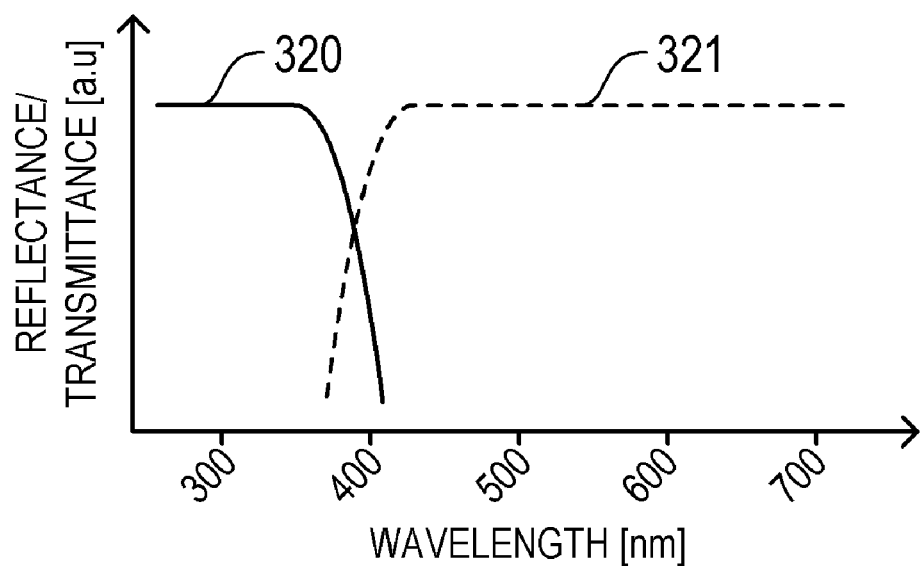
FIG. 6 is a graph showing an example of a characteristic of a dichroic filter according to Embodiment 1.

FIG. 6 is a graph showing examples of a spectral reflectance characteristic of the dichroic filter 107 and a spectral transmittance characteristic of the dichroic filter 107. The horizontal axis indicates the wavelength of light, and the vertical axis indicates the reflectance (spectral reflectance) and the transmittance (spectral transmittance). A solid line 320 in FIG. 6 indicates the spectral reflectance characteristic of the dichroic filter 107, and a broken line 321 indicates the spectral transmittance characteristic of the dichroic filter 107. The dichroic filter 107 has a structure in which, for example, a plurality of films having different refractive indexes are stacked on each other. With such a structure, a characteristic that the dichroic filter 107 reflects light having a specific wavelength and transmits light having a wavelength different from the specific wavelength is realized. From the spectral reflectance characteristic 320 in FIG. 6, it can be seen that the reflectance of the dichroic filter 107 is high in a wavelength range of not more than 350 nm, and hence the dichroic filter 107 has a characteristic that the dichroic filter 107 reflects the ultraviolet light. In addition, from the spectral reflectance characteristic 320, it can be seen that the reflectance of the dichroic filter 107 is sharply reduced with an increase in wavelength in a wavelength range of not less than 350 nm, and hence the dichroic filter 107 has a characteristic that the dichroic filter 107 does not reflect the white light. In addition, from the spectral transmittance characteristic 321, it can be seen that the transmittance of the dichroic filter 107 is high in a wavelength range of not less than 400 nm, and hence the dichroic filter 107 has a characteristic that the dichroic filter 107 transmits the white light. With such characteristics, the dichroic filter 107 can be used as a filter that separates the ultraviolet light from the white light.

The ultraviolet light 210 (2) reflected by the dichroic filter 107 is returned to the quantum dot sheet 108. In a case where the violet light 210 (2) becomes incident on the quantum dot sheet 108, a wavelength conversion 220 (2) is performed. In the wavelength conversion 220 (2), part of the ultraviolet light 210 (2) acts as the excitation light, and part of the ultraviolet light 210 (2) is converted to white light 211 (2) as the fluorescence. The rest of the ultraviolet light 210 (2) passes through the quantum dot sheet 108 without being converted thereto. In FIG. 4, ultraviolet light 210 (3) is the ultraviolet light 210 (2) having passed through the quantum dot sheet 108. The ultraviolet light 210 (3) and the white light 211 (2) are reflected by the mirror reflection plate 201.

Figure 7:
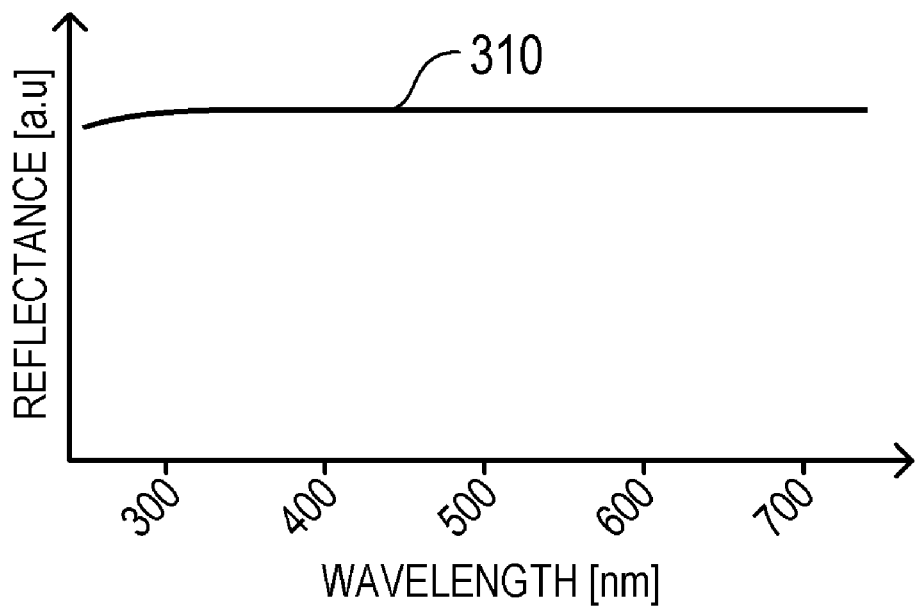
FIG. 7 is a graph showing an example of a characteristic of a mirror reflection plate according to Embodiment 1.

FIG. 7 is a graph showing an example of the spectral reflectance characteristic of the mirror reflection plate 201. The horizontal axis indicates the wavelength of light, and the vertical axis indicates the reflectance (the spectral reflectance). A solid line 310 in FIG. 7 indicates the spectral reflectance characteristic of the mirror reflection plate 201.

From the spectral reflectance characteristic 310 in FIG. 7, it can be seen that the reflectance of the mirror reflection plate 201 is high in a wide wavelength range of 350 to 700 nm, and hence the mirror reflection plate 201 has a characteristic that the mirror reflection plate 201 reflects the ultraviolet light and the white light.

The white light 211 (2) reflected by the mirror reflection plate 201 becomes incident on the quantum dot sheet 108, and much of the white light 211 (2) passes through the quantum dot sheet 108. This is because, in the quantum dot, the excitation that uses the ultraviolet light as the excitation light (primary excitation) occurs easily, but the excitation that uses the white light as the excitation light (secondary excitation) does not occur easily. Thereafter, the white light 211 (2) passes through the dichroic filter 107 and the optical sheet 106.

The ultraviolet light 210 (3) reflected by the mirror reflection plate 201 is returned to the quantum dot sheet 108. In a case where the ultraviolet light 210 (3) becomes incident on the quantum dot sheet 108, similarly to the wavelength conversion 220 (1), a wavelength conversion 220 (3) is performed. Thereafter, similarly, the reflection in the dichroic filter 107 and the reflection in the mirror reflection plate 201 are repeatedly performed. As a result, the wavelength conversion is repeatedly performed (a wavelength conversion 220 (4) and a wavelength conversion 220 (5)).

Thus, in the present embodiment, the ultraviolet light emitted from the light-emitting block 111 is reflected by the dichroic filter 107. Accordingly, it is possible to prevent the ultraviolet light from being emitted from the backlight apparatus. In addition, in the present embodiment, the reflection in the dichroic filter 107 and the reflection in the mirror reflection plate 201 are repeated. With this, it is possible to convert most of the ultraviolet light emitted from the light-emitting block 111 to the white light in the quantum dot sheet 108 by the wavelength conversion. As a result, it is possible to improve the extraction efficiency of the white light from the backlight apparatus and, by extension, reduce the power consumption of the backlight apparatus and increase the display brightness. The extraction efficiency of the white light is, e.g., the ratio of the white light from the backlight apparatus to the ultraviolet light from the light-emitting block 111 (the light amount, brightness, or intensity of the ultraviolet light).

Figure 8:
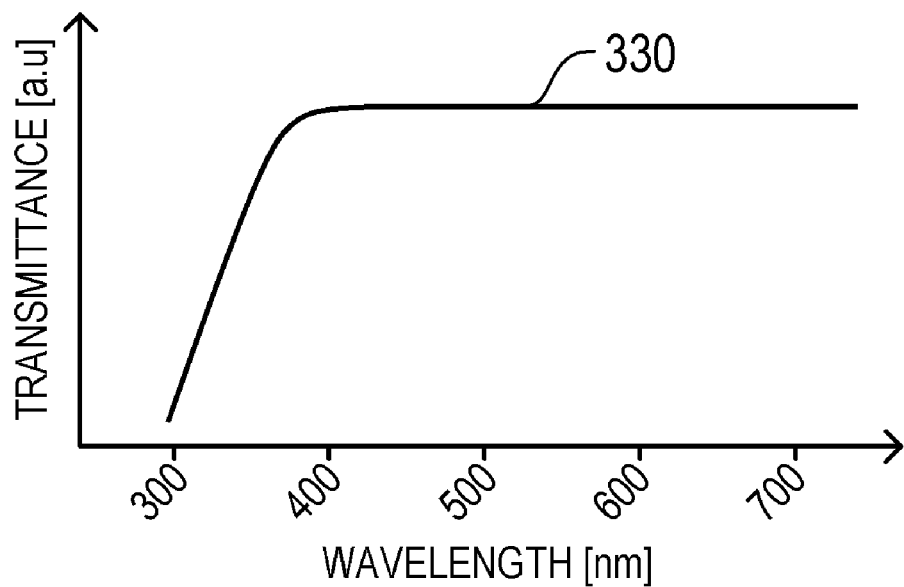
FIG. 8 is a graph showing an example of a characteristic of an optical sheet according to Embodiment 1.

An example of the effect of the present embodiment will be described. FIG. 8 is a graph showing an example of the spectral transmittance characteristic of the optical sheet 106. The horizontal axis indicates the wavelength of light, and the vertical axis indicates the transmittance (the spectral transmittance). A solid line 330 in FIG. 8 indicates the spectral transmittance characteristic of the optical sheet 106. From the spectral transmittance characteristic 330 in FIG. 8, it can be seen that the transmittance of the optical sheet 106 is high in a wavelength range of not less than 400 nm, and hence the optical sheet 106 has a characteristic that the optical sheet 106 transmits the white light. In addition, from the spectral transmittance characteristic 330, it can be seen that the transmittance of the optical sheet 106 is low in a wavelength range of less than 400 nm, and hence the optical sheet 106 has a characteristic that the optical sheet 106 scarcely transmits the ultraviolet light.

A conventional backlight apparatus does not have the dichroic filter 107 and the mirror reflection plate 201. Accordingly, much of the ultraviolet light emitted from the light-emitting block 111 becomes incident on the optical sheet 106. Subsequently, most of the ultraviolet light incident on the optical sheet 106 passes through the optical sheet 106 or is absorbed by the optical sheet 106 or other members. As a result, the ultraviolet light is emitted from the backlight apparatus, and the extraction efficiency of the white light from the backlight apparatus is reduced.

On the other hand, in the present embodiment, since the ultraviolet light emitted from the light-emitting block 111 is reflected by the dichroic filter 107, the ultraviolet light emitted from the light-emitting block 111 does not become incident on the optical sheet 106. Accordingly, it is possible to prevent the ultraviolet light from being emitted from the backlight apparatus. In addition, in the present embodiment, the reflection in the dichroic filter 107 and the reflection in the mirror reflection plate 201 are repeated. Accordingly, most of the ultraviolet light emitted from the light-emitting block 111 is converted to the white light in the quantum dot sheet 108 by the wavelength conversion, and the white light passes through the optical sheet 106. As a result, it is possible to realize the high extraction efficiency of the white light from the backlight apparatus.

Thus, according to the present embodiment, it is possible to prevent the light (the first light; the ultraviolet light) different from the desired light (the second light; the white light) from being emitted from the light-emitting apparatus. Further, according to the present embodiment, it is possible to improve the extraction efficiency of the second light from the light-emitting apparatus and, by extension, reduce the power consumption of the light-emitting apparatus and increase the display brightness.

Note that the configuration of the light-emitting apparatus according to the present embodiment is not limited to the configuration shown in FIG. 4 or the like. For example, the shape of each member described in the present embodiment is not particularly limited. For example, as the quantum dot sheet 108, instead of the sheet-like member, a plate-like member having a certain thickness and a planar member as a combination of small members may also be used. A holding member that holds a member may be provided in at least any of a plurality of the members described in the present embodiment. For example, the quantum dot sheet 108 may be held by a glass circuit board. At least any of a plurality of the members described in the present embodiment may be positioned away from the other members, or may also be in close contact with the other members. At least two of a plurality of the members described in the present embodiment may be integrally configured. For example, the quantum dot sheet 108 may be in close contact with the dichroic filter 107.

Embodiment 2

Hereinbelow, Embodiment 2 of the present invention will be described. In the present embodiment, a configuration capable of reducing color variations of light from the light-emitting apparatus will be described. Note that the same members as those in Embodiment 1 are designated by the same reference numeral as those in Embodiment 1, and the description thereof will be omitted.

First, color variations of light emitted from the backlight apparatus of Embodiment 1 will be described. In the backlight apparatus of Embodiment 1, after the white light 211 (2) reflected by the mirror reflection plate 201 becomes incident on the quantum dot sheet 108, small secondary excitation that uses the white light 211 (2) as the excitation light occurs in the quantum dot sheet 108.

Figure 9:
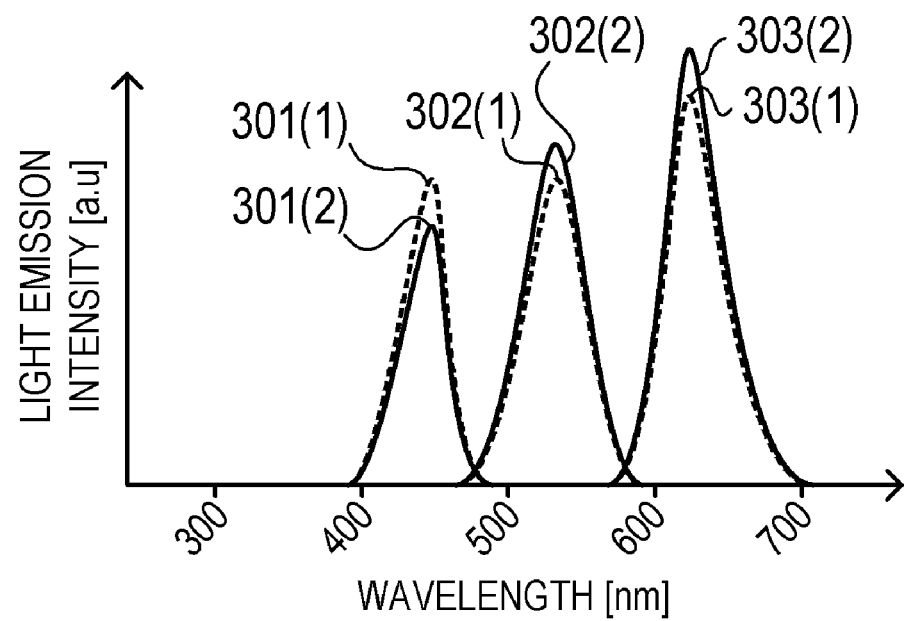
FIG. 9 is a graph showing an example of a spectral characteristic change of the white light by secondary excitation.

FIG. 9 is a graph showing an example of a spectral characteristic change of the white light by the secondary excitation. The horizontal axis indicates the wavelength of light, and the vertical axis indicates the intensity of light. In the primary excitation that uses the ultraviolet light as the excitation light, white light including blue light 301 (1), green light 302 (1), and red light 303 (1) is obtained. In a case where this white light becomes incident on the quantum dot sheet 108, the small secondary excitation that uses the blue light 301 (1) as the excitation light occurs. With the secondary excitation, green light and red light each as the fluorescence are generated. Accordingly, in a case where the secondary excitation has occurred, white light including blue light 301 (2), green light 302 (2), and red light 303 (2) is obtained. In FIG. 9, the intensity of the blue light 301 (2) is lower than the intensity of the blue light 301 (1), the intensity of the green light 302 (2) is higher than the intensity of the green light 302 (1), and the intensity of the red light 303 (2) is higher than the intensity of the red light 303 (1). Accordingly, in the case where the secondary excitation has occurred, the white light having a color close to red or yellow as compared with the color of the white light in the case where the secondary excitation does not occur is obtained. In other words, the color of the white light becomes close to red or yellow due to the secondary excitation.

In the example in FIG. 4, in the wavelength conversion 220 (1) performed at a position closest to the light-emitting block 111, the secondary excitation does not occur. On the other hand, in each of the wavelength conversions 220 (3) and 220 (5) performed at positions away from the light-emitting block 111, the secondary excitation that uses the white light reflected by the mirror reflection plate 201 as the excitation light occurs. As a result, in the surface parallel to the light-emitting surface, circular color variations in which the color of the white light becomes closer to red or yellow with distance from the center of the light-emitting block 111 occur. In the local dimming control, there are cases where the light-emitting block 111 around the light-emitting block 111 that emits light with the high light emission brightness emits light with the low light emission brightness. The above-described color variations become conspicuous particularly in such cases. Specifically, in the surface parallel to the light-emitting surface, circular color variations in which the color of the white light becomes closer to red or yellow with distance from the center of the light-emitting block 111 that emits light with the high light emission brightness occur.

Figure 10:
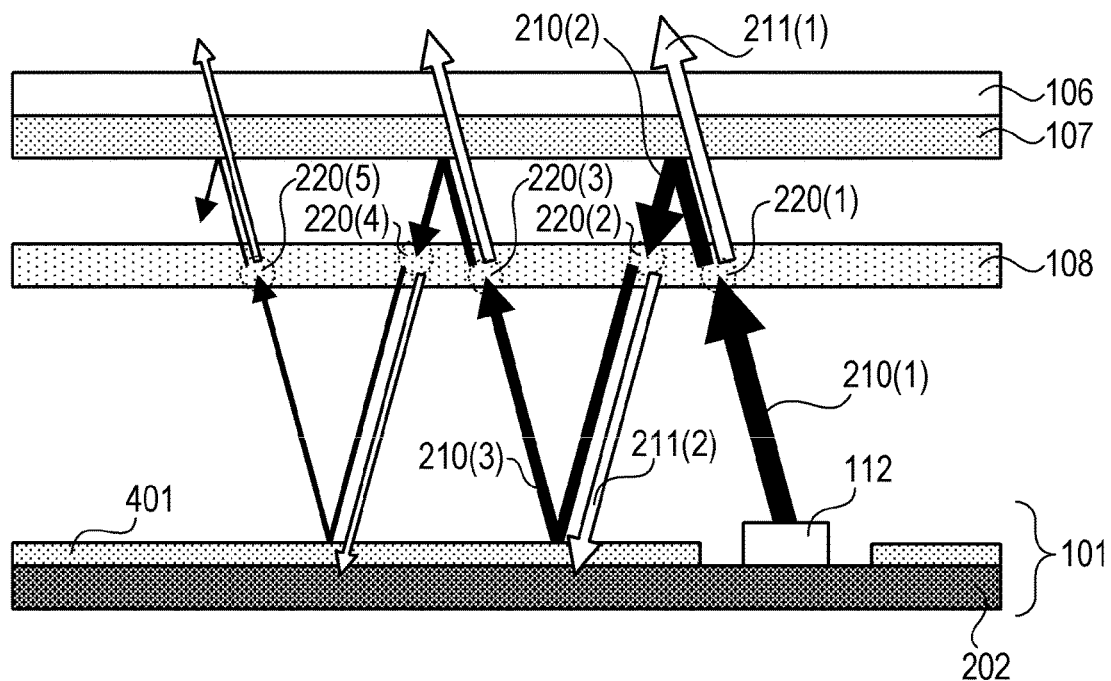
FIG. 10 is a cross-sectional view showing an example of the configuration of the backlight apparatus according to Embodiment 2.

In the present embodiment, the configuration capable of reducing the color variations will be described. FIG. 10 is a cross-sectional view showing an example of the configuration of the backlight apparatus according to the pre sent embodiment. The backlight apparatus according to the present embodiment has a dichroic filter 401 instead of the mirror reflection plate 201 in FIG. 4. The characteristic of the dichroic filter 401 is substantially identical to the characteristic of the dichroic filter 107. In the present embodiment, "substantially identical" implies "completely identical". That is, the dichroic filter 401 reflects the first light (the ultraviolet light), and transmits the second light (the white light). For example, the dichroic filter 401 reflects the ultraviolet light that travels from the side of the light-emitting surface to the side of the circuit board 202 to the side of the light-emitting surface, and transmits the white light that travels from the side of the light-emitting surface to the side of the circuit board 202.

As described in Embodiment 1, in a case where the ultraviolet light 210 (2) becomes incident on the quantum dot sheet 108, the wavelength conversion 220 (2) is performed. As a result, the ultraviolet light 210 (3) and the white light 211 (2) become incident on the dichroic filter

401. The ultraviolet light 210 (3) incident on the dichroic filter 401 is reflected by the dichroic filter 401, similarly to Embodiment 1. On the other hand, the white light 211 (2) incident on the dichroic filter 401 passes through the dichroic filter 401. In the present embodiment, the white light 211 (2) having passed through the dichroic filter 401 is absorbed by the circuit board 202. Accordingly, it is possible to prevent the white light from becoming incident on the quantum dot sheet 108, and prevent the occurrence of the secondary excitation. As a result, it is possible to reduce the color variations described above.

Thus, according to the present embodiment, the reflection member that reflects the first light and transmits the second light is used. With this, it is possible to prevent the occurrence of the secondary excitation, and reduce the color variations of light from the light-emitting apparatus. In addition, similarly to Embodiment 1, the reflection of the first light in the first filter member is performed. With this, it is possible to prevent the light different from the desired light from being emitted from the light-emitting apparatus. Further, similarly to Embodiment 1, the reflection of the first light in the first filter member and the reflection of the first light in the reflection member are repeated. With this, it is possible to realize the high extraction efficiency of the second light from the light-emitting apparatus.

Embodiment 3

Hereinbelow, Embodiment 3 of the present invention will be described. In the present embodiment, another configuration capable of reducing the color variations of light from the light-emitting apparatus will be described. Note that the same members as those in Embodiment 1 are designated by the same reference numerals as those in Embodiment 1, and the description thereof will be omitted.

Figure 11:
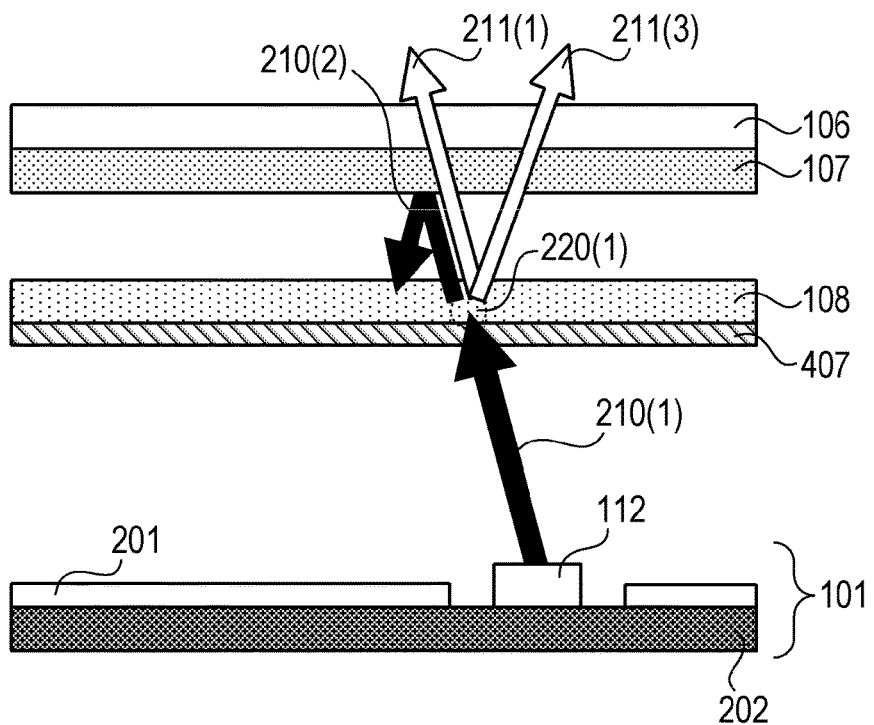
FIG. 11 is a cross-sectional view showing an example of the configuration of the backlight apparatus according to Embodiment 3.

FIG. 11 is a cross-sectional view showing an example of the configuration of the backlight apparatus according to the present embodiment. The backlight apparatus according to the present embodiment further has a dichroic mirror 407. The dichroic mirror 407 is provided between the LED circuit board 101 and the quantum dot sheet 108. That is, in the direction from the light-emitting block 111 toward the light-emitting surface, the light-emitting block 111, the dichroic mirror 407, the quantum dot sheet 108, the dichroic filter 107, and the optical sheet 106 are provided in this order. The mirror reflection plate 201 is provided in a side of the light-emitting block 111 from the dichroic mirror 407.

The dichroic mirror 407 is a second filter member that transmits the first light and reflects the second light. That is, the dichroic mirror 407 has a characteristic opposite to the characteristic of the dichroic filter 107. For example, the dichroic mirror 407 transmits the ultraviolet light that travels from the side of the light-emitting surface to the side of the circuit board 202 and the ultraviolet light that travels from the side of the circuit board 202 to the side of the light-emitting surface, and reflects the white light that travels from the side of the light-emitting surface to the side of the circuit board 202 to the side of the light-emitting surface.

Note that the configuration of the second filter member is not particularly limited. For example, a cold mirror that transmits ultraviolet light and infrared light, and reflects visible light may be used as the second filter member.

Figure 12:
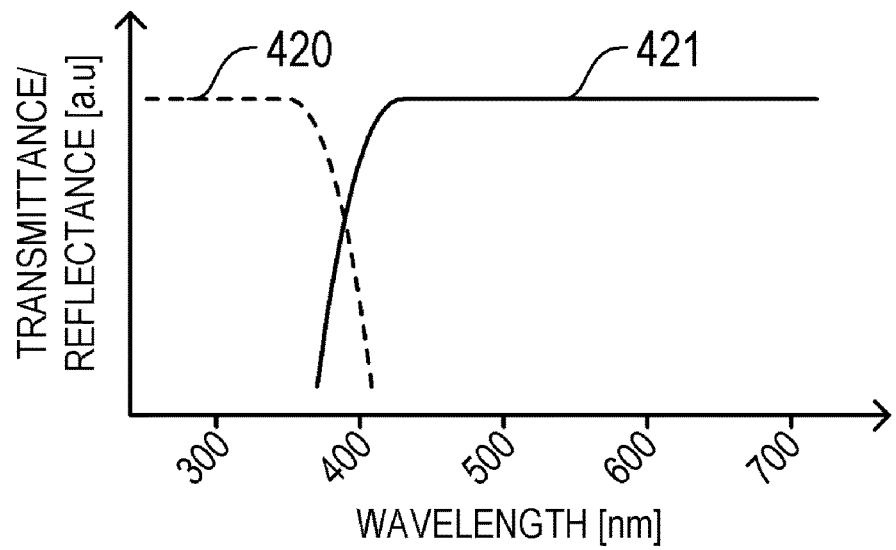
FIG. 12 is a graph showing an example of a characteristic of a dichroic mirror according to Embodiment 3.

FIG. 12 is a graph showing examples of the spectral transmittance characteristic of the dichroic mirror 407 and the spectral reflectance characteristic of the dichroic mirror 407. The horizontal axis indicates the wavelength of light, and the vertical axis indicates the transmittance (the spectral transmittance) and the reflectance (the spectral reflectance). A broken line 420 in FIG. 12 indicates the spectral transmittance characteristic of the dichroic mirror 407, and a solid line 421 indicates the spectral reflectance characteristic of the dichroic mirror 407. From the spectral transmittance characteristic 420 in FIG. 12, it can be seen that the transmittance of the dichroic mirror 407 is high in a wavelength range of not more than 350 nm, and hence the dichroic mirror 407 has a characteristic that the dichroic mirror 407 transmits the ultraviolet light. In addition, from the spectral transmittance characteristic 420, it can be seen that the transmittance of the dichroic mirror 407 is sharply reduced with an increase in wavelength in a wavelength range of not less than 350 nm, and hence the dichroic mirror 407 has a characteristic that the dichroic mirror 407 does not transmit the white light. In addition, from the spectral reflectance characteristic 421, it can be seen that the reflectance of the dichroic mirror 407 is high in a wavelength range of not less than 400 nm, and hence the dichroic mirror 407 has a characteristic that the dichroic mirror 407 reflects the white light.

As shown in FIG. 11, the ultraviolet light 210 (1) emitted from the light-emitting block 111 passes through the dichroic mirror 407, and becomes incident on the quantum dot sheet 108. In a case where the ultraviolet light 210 (1) becomes incident on the quantum dot sheet 108, similarly to Embodiment 1, the wavelength conversion 220 (1) is performed. Although not considered in Embodiment 1 and Embodiment 2, the white light obtained by the wavelength conversion is emitted from the quantum dot sheet 108 in various directions (all directions). Accordingly, the white light obtained by the wavelength conversion 220 (1) is emitted from the quantum dot sheet 108 to the side of the dichroic filter 107, and is also emitted from the quantum dot sheet 108 to the side of the dichroic mirror 407 (the side of the circuit board 202). The white light emitted from the quantum dot sheet 108 to the side of the dichroic mirror 407 is reflected by the dichroic mirror 407, and then travels toward the dichroic filter 107 as white light 211 (3). Similarly to the white light 211 (1), the white light 211 (3) passes through the dichroic filter 107 and the optical sheet 106. Similarly to the white light 211 (1) and the white light 211 (3), the white light obtained by the other wavelength conversions passes through the dichroic filter 107 and the optical sheet 106. As a result, it is possible to prevent the occurrence of the secondary excitation, and reduce the color variations of light from the backlight apparatus.

Thus, according to the present embodiment, the second filter member that transmits the first light and reflects the second light is provided between the circuit board (the reflection member and the light source) and the conversion member. With this, it is possible to prevent the occurrence of the secondary excitation and reduce the color variations of light from the light-emitting apparatus. In addition, similarly to Embodiment 2, the reflection of the first light in the first filter member is performed. With this, it is possible to prevent the light different from the desired light from being emitted from the light-emitting apparatus. Further, similarly to Embodiment 2, the reflection of the first light in the first filter member and the reflection of the first light in the reflection member are repeated. With this, it is possible to realize the high extraction efficiency of the second light from the light-emitting apparatus. Furthermore, in the present embodiment, since the second light is reflected by the second filter member, it is possible to prevent the second light from being absorbed by the circuit board or the like, and realize the extraction efficiency higher than that in Embodiment 2.

Embodiment 4

Hereinbelow, Embodiment 4 of the present invention will be described. In the present embodiment, another configuration capable of reducing the color variations of light from the light-emitting apparatus will be described. Note that the same members as those in Embodiment 1 are designated by the same reference numerals as those in Embodiment 1, and the description thereof will be omitted.

Figure 13:
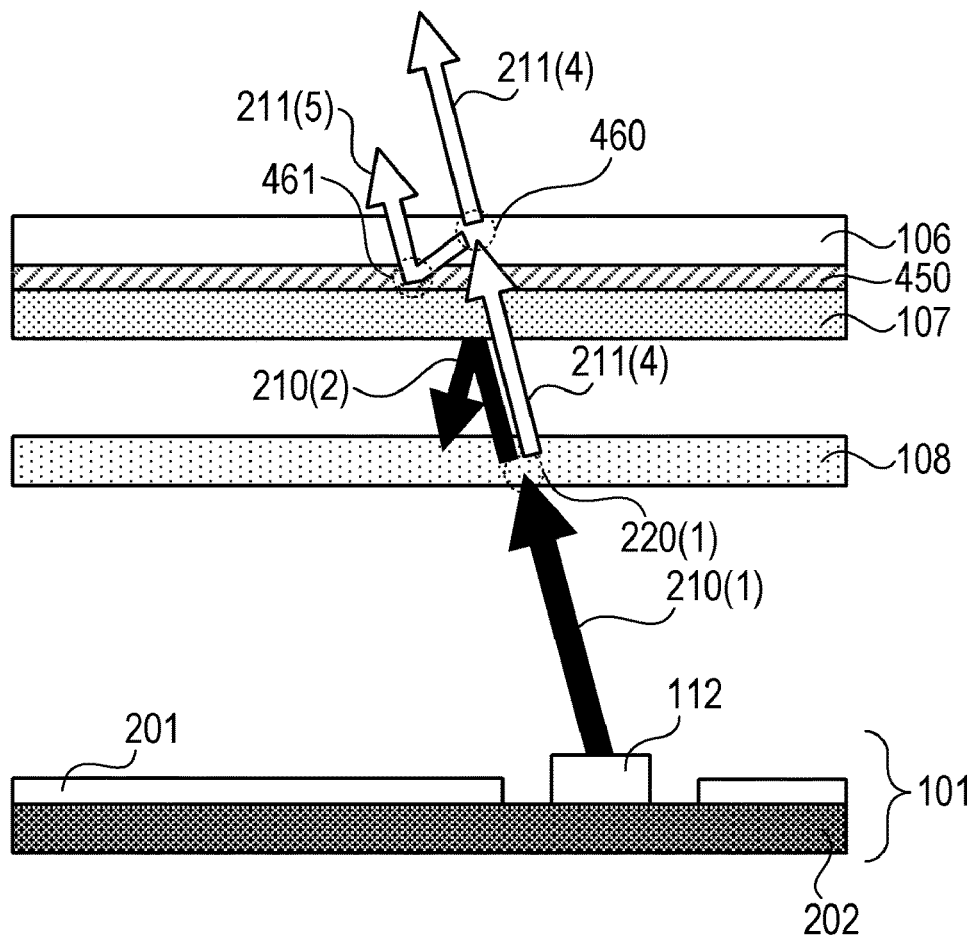
FIG. 13 is a cross-sectional view showing an example of the configuration of the backlight apparatus according to Embodiment 4.

FIG. 13 is a cross-sectional view showing an example of the configuration of the backlight apparatus according to the present embodiment. The backlight apparatus according to the present embodiment further has a half mirror 450. The half mirror 450 is provided between the dichroic filter 107 and the optical sheet 106. That is, in the direction from the light-emitting block 111 toward the light-emitting surface, the light-emitting block 111, the quantum dot sheet 108, the dichroic filter 107, the half mirror 450, and the optical sheet 106 are provided in this order. The half mirror 450 has a characteristic that the half mirror 450 reflects light from the side of the light-emitting surface, and transmits light from the side of the light-emitting block 111.

Similarly to Embodiment 1, the ultraviolet light 210 (1) emitted from the light-emitting block 111 becomes incident on the quantum dot sheet 108. In a case where the ultraviolet light 210 (1) becomes incident on the quantum dot sheet 108, similarly to Embodiment 1, the wavelength conversion 220 (1) is performed. Subsequently, the white light 211 (1) obtained by the wavelength conversion 220 (1) passes through the dichroic filter 107 and the half mirror 450, and becomes incident on the optical sheet 106. Although not considered in Embodiments 1 to 3, each of the reflectance of the diffusion plate 102 of the optical sheet 106 and the reflectance of the reflective polarizing film 104 of the optical sheet 106 is about 50% in general. Accordingly, only part of the white light 211 (1) incident on the optical sheet 106 passes through the optical sheet 106 as white light 211 (4). The rest of the white light 211 (1) incident on the optical sheet 106 is reflected by the optical sheet 106 as white light 211 (5) (reflection 460). In a case where the white light 211 (5) becomes incident on the quantum dot sheet 108, the secondary excitation occurs, and the color variations occur. In the present embodiment, the white light 211 (5) is reflected by the half mirror 450 (reflection 461), and is returned to the optical sheet 106. Subsequently, the white light 211 (5) passes through the optical sheet 106. Similarly to the white light 211 (1), the white light obtained by the other wavelength conversions passes through the dichroic filter 107, the half mirror 450, and the optical sheet 106, and is reflected by the half mirror 450 and the optical sheet 106. As a result, it is possible to prevent the occurrence of the secondary excitation, and reduce the color variations of light from the backlight apparatus.

In a case where the white light becomes incident on the optical sheet 106, there are cases where the white light is diffused in the optical sheet 106, and the diffused white light (diffused white light) travels in a direction away from the light-emitting surface. In the present embodiment, the diffused white light that travels in the direction away from the light-emitting surface is reflected by the half mirror 450, and passes through the optical sheet 106. As a result, it is possible to prevent the occurrence of the secondary excitation that uses the diffused white light as the excitation light, and reduce the color variations of light from the backlight apparatus.

Thus, according to the present embodiment, the half mirror that reflects light from the side of the light-emitting surface and transmits light from the side of the light source is provided between the first filter member and the optical member. With this, it is possible to prevent the occurrence of the secondary excitation, and reduce the color variations of light from the light-emitting apparatus. In addition, similarly to Embodiment 2, the reflection of the first light in the first filter member is performed. With this, it is possible to prevent the light different from the desired light from being emitted from the light-emitting apparatus. Further, similarly to Embodiment 2, the reflection of the first light in the first filter member and the reflection of the first light in the reflection member are repeated. With this, it is possible to realize the high extraction efficiency of the second light from the light-emitting apparatus. Furthermore, in the present embodiment, since the second light is reflected by the half mirror, it is possible to prevent the second light from being absorbed by the circuit board or the like, and realize the extraction efficiency higher than that in Embodiment 2.

Note that Embodiments 1 to 4 are only exemplary, and the configuration obtained by appropriately modifying or changing the configurations of Embodiments 1 to 4 within the scope of the present invention is also included in the present invention. The configuration obtained by appropriately combining the configurations of Embodiments 1 to 4 is also included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-221970, filed on Nov. 12, 2015, which is hereby incorporated by reference herein in its entirety.

What is claimed is:

1. A light-emitting apparatus configured to emit light from a light-emitting surface, comprising:
    a light source configured to emit first light that is ultraviolet light or near-ultraviolet light;
    a conversion member configured to convert the first light to second light that is white light;
    a first filter member configured to reflect the first light and transmit the second light; and
    a second filter member configured to transmit the first light and reflect the second light, wherein
    the light source, the conversion member, the first filter member, and the second filter member are provided in an order of the light source, the second filter member, the conversion member, and the first filter member in a direction from the light source toward the light-emitting surface.

2. The light-emitting apparatus according to claim 1, wherein
    the second light includes blue light, green light, and red light.

3. The light-emitting apparatus according to claim 1, wherein
    the conversion member has a quantum dot.

4. The light-emitting apparatus according to claim 1, wherein
    the first filter member is a dichroic filter or a cold filter.

5. The light-emitting apparatus according to claim 1, wherein
the second filter member is a dichroic filter or a cold filter.

6. The light-emitting apparatus according to claim 1, further comprising:
an optical member configured to optically change incident light, wherein
the light source, the conversion member, the first filter member, the second filter member, and the optical member are provided in an order of the light source, the second filter member, the conversion member, the first filter member, and the optical member in the direction from the light source toward the light-emitting surface.

7. The light-emitting apparatus according to claim 6, wherein
the optical member includes a diffusion member.

8. The light-emitting apparatus according to claim 1, further comprising:
a reflection member configured to reflect light, wherein
the reflection member is provided in a side of the light source from the conversion member, and
the reflection member is provided in a vicinity of the light source in a direction parallel to the light-emitting surface.

9. The light-emitting apparatus according to claim 8, further comprising:
a circuit board substantially parallel to the light-emitting surface, wherein
the light source and the reflection member are provided on the circuit board.

10. An image display apparatus comprising:
the light-emitting apparatus according to claim 1; and
a display unit configured to display an image on a screen by transmitting light from the light-emitting apparatus.

11. A light-emitting apparatus configured to emit light from a light-emitting surface, comprising:
a light source configured to emit first light that is ultraviolet light or near-ultraviolet light;
a conversion member configured to convert the first light to second light that is white-light;
a first filter member configured to reflect the first light and transmit the second light;
an optical member configured to optically change incident light; and
a half mirror configured to reflect light from a side of the light-emitting surface and transmit light from a side of the light source, wherein
the light source, the conversion member, the first filter member, the optical member, and the half mirror are provided in an order of the light source, the conversion member, the first filter member, the half mirror, and the optical member in the direction from the light source toward the light-emitting surface.

12. The light-emitting apparatus according to claim 11, wherein
the second light includes blue light, green light, and red light.

13. The light-emitting apparatus according to claim 11, wherein
the conversion member has a quantum dot.

14. The light-emitting apparatus according to claim 11, wherein
the first filter member is a dichroic filter or a cold filter.

15. An image display apparatus comprising:
the light-emitting apparatus according to claim 11; and
a display unit configured to display an image on a screen by transmitting light from the light-emitting apparatus.

16. A light-emitting apparatus configured to emit light from a light-emitting surface, comprising:
a light source configured to emit first light that is ultraviolet light or near-ultraviolet light;
a conversion member configured to convert the first light to second light that is white light;
a first filter member configured to reflect the first light and transmit the second light; and
a reflection member configured to reflect light, wherein
the light source, the conversion member, and the first filter member are provided in an order of the light source, the conversion member, and the first filter member in a direction from the light source toward the light-emitting surface, and
the reflection member reflects the first light, and transmits or absorbs the second light.

17. The light-emitting apparatus according to claim 16, wherein
the second light includes blue light, green light, and red light.

18. The light-emitting apparatus according to claim 16, wherein
the conversion member has a quantum dot.

19. The light-emitting apparatus according to claim 16, wherein
the first filter member is a dichroic filter or a cold filter.

20. An image display apparatus comprising:
the light-emitting apparatus according to claim 16; and
a display unit configured to display an image on a screen by transmitting light from the light-emitting apparatus.

* * * * *